United States Patent
Kawashima

(12) 
(10) Patent No.: US 6,704,658 B2
(45) Date of Patent: Mar. 9, 2004

(54) METHOD FOR PREDICTING SEISMIC EVENT USING VALUE OF MAGNITUDE, POSITION OF SEISMIC EVENT, TIME OF SEISMIC EVENT, USING SEISMOGRAPH FOR MEASURING QUAKE OF EARTH

(76) Inventor: Masatoshi Kawashima, Nakanojo 1282-1, Sakaki-machi, Hanishina-gun, Nagano (JP)

( * ) Notice: Subject to any disclaimer, the term of this patent is extended or adjusted under 35 U.S.C. 154(b) by 0 days.

(21) Appl. No.: 10/020,943

(22) Filed: Dec. 19, 2001

(65) Prior Publication Data

US 2002/0103603 A1 Aug. 1, 2002

(51) Int. Cl.⁷ .............................. G06F 19/00; G01V 1/00
(52) U.S. Cl. ............................................. 702/15; 367/73
(58) Field of Search ................... 702/15; 367/73

(56) References Cited

U.S. PATENT DOCUMENTS

| | | | |
|---|---|---|---|
| 4,227,198 A | * 10/1980 | Preskitt et al. | ............... 346/1.1 |
| 5,490,062 A | * 2/1996 | Leach et al. | ................... 702/15 |
| 5,890,094 A | * 3/1999 | Zschau | ........................ 702/15 |
| 6,091,361 A | * 7/2000 | Davis et al. | ................. 342/378 |

OTHER PUBLICATIONS

"Spatial Distribution of Time–Independent Seismicity in China", Qin et al., Pure and Applied Geophysics, pp. 101–119, 1999.*

* cited by examiner

*Primary Examiner*—John Barlow
*Assistant Examiner*—Toan M Le
(74) *Attorney, Agent, or Firm*—Shlesinger Arkwright & Garvey LLP

(57) ABSTRACT

A method of judging the degree of risk of a seismic event by obtaining a condition of activities in the earth's crust using seismic data disclosed in the Internet and the like. An analysis and calculating method capable of calculating sufficiently by way of a personal computer for the purpose of obtaining the conditions of the activities in the earth's crust by means of a dynamical analysis of a continuum more than M5 greater than the value of an empirical rule based on the common analyzing results before a seismic event by analyzing the characteristics of the seismic activities from the value of magnitude and the value of coordinates indicating a seismic source and an occurrence time among seismic data.

30 Claims, 17 Drawing Sheets

METHOD FOR PREDICTING SEISMIC EVENT USING VALUE OF MAGNITUDE, POSITION OF SEISMIC EVENT, TIME OF SEISMIC EVENT, USING SEISMOGRAPH FOR MEASURING QUAKE OF EARTH

BACKGROUND OF THE INVENTION

1. Field of the Invention

A forecasting field of a seismic event, getting hold of a condition of an activity of the earth's crust, precaution of an accident in accordance with a seismic event, and reduction thereof.

2. Description of the Background Art

There has been a patent application using an electromagnetic method in Japan. On the contrary, there has been no method of forecasting a seismic event registered a magnitude of more than 5 and a narrow region by way of a value of magnitude indicating a seismic scale, the time of the seismic event, and the position of the seismic source, using a seismograph for measuring in a wide area.

The term "seismic source" as used herein means "seismic hypocenter" and not "epicenter."

SUMMARY OF THE INVENTION

The present invention is to find the state of being possible and the significant condition of being related between seismic events registered a magnitude of more than 5, using the value of magnitude indicating a seismic scale, the time of the seismic events, and the position of seismic sources, which have been obtained by a seismograph, and to provide a method therefor.

(1) Seismic data as fundamental data are defined as $x(t)$, $y(t)$, and $z(t)$, by defining x as latitude, y as longitude, z as depth from the earth's surface by defining coordinates of positions of a seismic source as a time t. The value of magnitude of the earthquake of the same seismic event is defined as $m(t)$.

(2) The positions of the coordinates for measured data during the time between a time t1 and a time t2 are defined as $sx(tt1)$, $sy(tt1)$, and $sz(tt1)$ in an early order using a parameter tt1. The value of magnitude of the same earthquake is defined as $mx1(tt1)$. It is considered that the parameter tt1 is equal to the number of the seismic events for calculating after the time t1.

That is to say, data of the 10-th seismic event from the time t1 are $sx1(10)$, $sy1(10)$, $sz1(10)$, and $mx1(10)$. They are fundamental data, thus it is recommended to store in a computer readable recording medium in a time series order. At this stage, for calculating, the range of time, the scope of space, and the scope of magnitude of the earthquake are not designated.

(3) The scope of magnitude of the earthquake, the scope of space coordinates, and the range of time of the measured data are designated. The range of time is indicated as the range from t3 to t4. The case in which a time t4 is the newest data in view of time among obtained data is included. The total number of the seismic events satisfying this condition is defined as nn. It is defined that xe, ye, and ze of the seismic events satisfying this condition are latitude, longitude, and depth from the earth respectively, and they are defined as $xe(tt2)$, $ye(tt2)$, and $ze(tt2)$ respectively. The value of magnitude of the earthquake of the same event is defined as $me1(tt2)$. A parameter tt2 is the number of the seismic event as a target in an early order. Therefore, it is performed to calculate based on these values. For the scope of magnitude of the earthquake, though it is enough regularly to provide the lower limit, it may also be possible to provide the upper limit if there are wrong data (there is a magnitude of 9.9) or if a specific purpose is planned.

(4) For x, y, and z (3 dimensional coordinates of the seismic source), it is common that raw data are indicated by latitude and longitude in accordance with the 3 dimensional space coordinates of the paragraph (3), thus it is performed to transform in order to make into the same unit (kilometer is used in general as the unit).

(5) The basic points (which are indicated by points) to be set first of all about $xe(tt2)$, $ye(tt2)$, and $ze(tt2)$ are defined as $xe(0)$, $ye(0)$, and $ze(0)$. The value of tt2 varies from 1 to nn.

It is performed to calculate $ss0(tt2)^2=((xe(tt2)-xe(tt2-1))^2)pa+((ye(tt2)-ye(tt2))-ye(tt2-1))^2)pb+(ze(tt2)-ze(tt2-1))^2$. Symbols pa and pb are coefficients in order to adjust to a unit of $ze(tt2)$.

In general, since depth indicated by $ze(tt2)$ is indicated by kilometer, it is unified by making into a common length unit. "^" is an operational symbol for indicating a power.

It is defined that $ss0(tt2)$ is the value of a plus value of the square root of $((xe(tt2)-xe(tt2-1))^2)pa+((ye(tt2)-ye(tt2-1))^2)pb+(ze(tt2)-ze(tt2-1))^2$.

(6) If the number of the seismic events for the period is defined as 5 in a uniform manner, the total number of periods come to be more than (nn/5). However, it is desirable to round up in the case in which fractions are found or produced. Accordingly, it is not performed to exclude data of fractions. The total number of periods which are defined in this way is defined as n2. The indication of the number for the period, in accordance with this period, is defined as I.

(7) If the number of the seismic events used for one period is defined as f, $ss1(I)=[\text{sigma}]\, ss0(tt2)/f$ is defined ([sigma] indicates the total number which varies from I=1 to the last period number n. This is not the total number n2 for the period) [sigma] is an operator for indicating the total number which varies from I=1 to the last period number n. In general, the meaning thereof is the same as a capital letter sigma of a Greek letter used in mathematics.

In other words, in the case in which it is performed to divide at the first diving point from the first period per f partitions without causing fractions, $ss1(1)=(ss0(1)+ss0(2)+\ldots+ss0(f))/f$ and $ss1(2)=(ss0(f+1)+ss0(f+2)+\ldots+ss0(f+f))/f$ are obtained. Though the parameter f varies from 1 to n2, if the value of f is too large, the results will have intervals. If the value of f is too small, we cannot help having the results as that we cannot see the wood for the trees. For the first $ss0(1)$, the distance from a spatial base which has been set in the first place is calculated. This calculated result is defined as $ss0(1)$. However, even if they are calculated in the same way, for $xe(1)$, $ye(1)$, $ze(1)$, and $me1(1)$ (the first data), by setting these as spatial bases and by excluding $me1(1)$ from the target of calculating its energy, the essential qualities of its calculation are not affected (however, immediately thereafter, its calculation is affected, especially, in the case in which the number of data is small).

(8) A calculating method in relation to getting hold of a space of the seismic source different from the paragraphs (5), (6), and (7), by obtaining the relative distance from its base based on the spatial base to data $(xe(tt2), ye(tt2), ze(tt2))$ as the target for calculation, is the method of setting a base for calculating per the partitioning unit indicated in the paragraph (6), based on the values thereof. In another way, the method thereof is to make the shortest distance or the vertical distance from a line and a face to be a base for its calculation. There is a difference between the line and the face: the line to be the base is a line which is indicated as an active fault in a geological figure; and the face is analyzed in relation to a spatial distribution based on the distance from a geophysical base and the face of the active fault.

The advantageous point thereof is to easily find out a blind spot in the case of using ss1(I) if xe(tt2), ye(tt2), and ze(tt2) which have been used in the paragraph (5) are used. In the case in which the spatial base is the line or the face, an expression for indicating the line and the space is created by setting latitude, longitude, and depth as the 3 dimensional coordinate bases, and then the distance from the line and the face is calculated. The units of the distance are unified.

(9) The distance from the bases about xe(tt2), ye(tt2), and ze(tt2) is obtained using data which satisfy the scope of magnitude, the range of time, and the scope of the space which are set in the paragraph (5) of exemplifying the paragraph (8). In the case in which the base is defined as a point, the coordinates as latitude, longitude, and depth of the point to be the bases are defined as xe(0), ye(0), and ze(0) respectively.

$ssq0(tt2)^2=((xe(tt2)-xe(0))^2)pa+((ye(tt2)-ye(0))^2)pb+(ze(tt2)-ze(0))^2$ is calculated.

The value of tt2 varies from 1 to nn. The coefficients pa and pb are used so as to adjust to a unit of ze(tt2). In general, since depth which is indicated by ze(tt2) is indicated by kilometer, the common length is used so as to justify.

For ssq0(tt2), the plus value of the square root of $((xe(tt2)-xe(0))^2)pa+((ye(tt2)-ye(0))^2)pb+(ze(tt2)-ze(0))^2$ is used.

(10) If the number of the seismic events for one period is defined as f, ssq1(I)=[sigma] ssq0(tt2)/f is defined. The value of I varies from 1 to n2. In other words, in the case of dividing at the first dividing point per f partitions without causing fractions from the first partition, ssq1(1)=(ssq0(1)+ssq0(2)+ . . . +ssq0(f))/f and ssq1(2)=(ssq0(f+1)+ssq0(f+2)+ . . . +ssq0(f+f))/f are obtained. Though the value of f varies from 1 to n2, if the value of f is too large, the results of calculation will have intervals. If the value of f is too small, we cannot help having the results as that we cannot see the wood for the trees.

(11) Though the difference between the calculating method for the space distribution of the seismic source of the paragraphs (5), (6), and (7) and the calculating method of the paragraphs (8), (9), and (10) for the space distribution of the seismic source is in that the calculation starting point set in the first place affects only the first data (xe(1), ye(1), and ze(1)) for the paragraphs (5), (6), and (7), the calculating methods which have been indicated in the paragraphs (8), (9), and (10) which have described the difference of analyzing the space distribution based on the distance from the spatial base set in the first place in relation to data for the seismic positions in the paragraphs (8), (9), and (10) may make it easy to find out a blind spot in the case of using ss1(I) if xe(tt2), ye(tt2), and ze(tt2) which have been used in the paragraph (5) are used.

In the case in which the spatial bases are the line and the face, an expression of indicating the line and the face is created by defining latitude, longitude, and depth as 3 dimensional coordinate bases, and then the distance from the line and the face is calculated. The unit of the distance is unified. In general, kilometer is used therefor.

(12) For me1(tt2), that is to say, magnitude which indicates energy of the earthquake, the upper and lower limits of magnitude of the seismic events are defined.

The value of total energy of the seismic events in the range of the period of the event is obtained from the value me1(tt2) of each earthquake. The expression used herein is a general expression log E=a+bM for calculating magnitude indicating energy of the earthquake. A unit of the value E of energy therefor is erg of seismology. The value M indicates the value of magnitude indicating the scale of the earthquake. Though the values a and b are not the same in accordance with the region, 1.5 is used for b in general.

Further, in addition thereto, an expression of log means a logarithm with 10 as the base. Further, the methods of calculating magnitude are not the same seismologically corresponding to a way of applying seismic data and a characteristic of the earth of its place.

Further, the total energy ee1(I) of the earthquake in the range of the period is $10^{(a+b(M1))}+10^{(a+b(M2))}+ \ldots$, and the sum total is eel(I). The value sme1(I) of magnitude is obtained, which corresponds to the value ee1(I) of energy in the region of the period. That is to say, sme1(I)=(log(ee1(I))−a)/b is obtained. The logarithm log in this case is the logarithm with 10 as the base for defining magnitude.

Further, for calculating this energy, the value of er1(I)=log(sme1(I+1)/sme1(I)) is used in [numerical expression 2]. In the case of using [numerical expression 3], needless to say, an absolute value, plus, or minus of (er1(I)−er1(I+1)) is important to the values a and b. However, as a matter of course, a and b for calculating magnitude are unified, except that the physical definition and meaning of data for using are changed.

(13) The index is obtained from ee1(I) or sme1(I) obtained in the paragraph (12) and ss1(I) and ssq1(I) obtained in the paragraphs (7), (8), and (9).

[numerical expression 1] [numerical expression 2]

(14) Though there have been data per the period in the case of the paragraph (6), the result of calculating data for the period might be equal to (ss1(I), or ssq1(I), or sme1(I) is 0 (zero) as the definition). Since an inconvenience is caused for calculating the logarithm, a counterplan is required. In such a case, it is recommended to change the length (the period of the event) of the period or the base point for starting calculation, in the case of using ssq1 (I).

In another way, for the value when sr1(I) and srq1(I) indicated by [numerical expression 1] are ∞, for example, +100 and −∞, it is recommended to avoid the condition, in which it is not possible to define, using −100, for example. In the case in which sme1(I) is 0, ee1(I) is used by unifying. In general, such a case is not caused by the current data.

(15) Further, the values ss0(I), ss1(I), ssq0(I), ssq1(I), me1(I), ee1(I), and sme1(I) which are obtained at the stages of obtaining respective periods are also kept. Especially, for ss1(I), ssq1(I), ee1(I), and sme1(I), these are required at the time of indicating the results of calculation or at the time of calculating [numerical expression 3].

(16) Dd1(I), Ddq1(I), and [numerical expression 3] are defined as follows.

(17) Using computer, it is convenient to display visually by setting the period in a horizontal axis, plotting changes of sr1(I), ssrr1(I), srq1(I), ssrqr1(I), sme1(I), er1(I), ssrr1(I), Dd1(I), and Ddq1(I) in the vertical axis by changing magnification suitably, coloring, and the like, and then linking them.

The horizontal axis may be used for a time interval, or the same horizontal axis may be used per the period.

[numerical expression 1] Liapunov coefficients:

sr1(I)=log(ss1(I+1)/ss1(I)):

ssr1(n)=[sigma] sr1(I): srq1(I)=log(ssq1(I+1)/ssq1(I)):

ssrq1(n)=[sigma] srq1(I):

ssrqr1(n)=[sigma] srq1(I)/n:ssrr1(n)=[sigma] sr1(I)/n: log with as the base. ([sigma] defines the sum total for I=1 to the last period number n. This not the sum total n2 of periods. [sigma] is an operator indicating the sum total for I=1 to the last period number n.) In general, this has the same meaning as a capital letter sigma of a Greek letter used in mathematics.

The meaning of ssr1(n)=[sigma] sr1(I) has the meaning of ssr1(n)=sr1(1)+sr1 (2)+ . . . +sr1 (n). The value n has the values of 1 to (n2−1).

[numerical expression 2] It is possible to substitute ee1(I) for sme(I) when calculating Liapunov coefficients:

er1(I)=log(ee1(I+1)/ee1(I)):

ser1(n)=[sigma] er1(I):ssrr1(n)=[sigma] er1(I)/n. Both of them have the same essential values. The value of n has the values of 1 to (n2−1).

[numerical expression 3] Dd1(I)=(er1(I)−er1(I+1))(sr1(I)−sr1(I+1))

Ddq1(I)=(er1(I)−er1(I+1))(srq1(I)−srq1(I+1)) The meaning of Dd1(I) has the meaning of the product of (er1(I)−er1(I+1)) and (sr1(I)−sr1(I+1)). The same relation is found in Ddq1(I). The value I has the values of 1 to (n2−2).

BRIEF DESCRIPTION OF THE DRAWINGS

FIG. 10 is a graph in which the number of seismic events for the period is 5.

FIG. 11 is a graph in which the number of seismic events for the period is 8.

FIG. 12 is a graph in which the number of seismic events for the period is 10.

FIG. 13 is a graph in which the number of seismic events for the period is 11.

FIG. 14 is a graph in which the number of seismic events for the period is 8.

Figure 1:
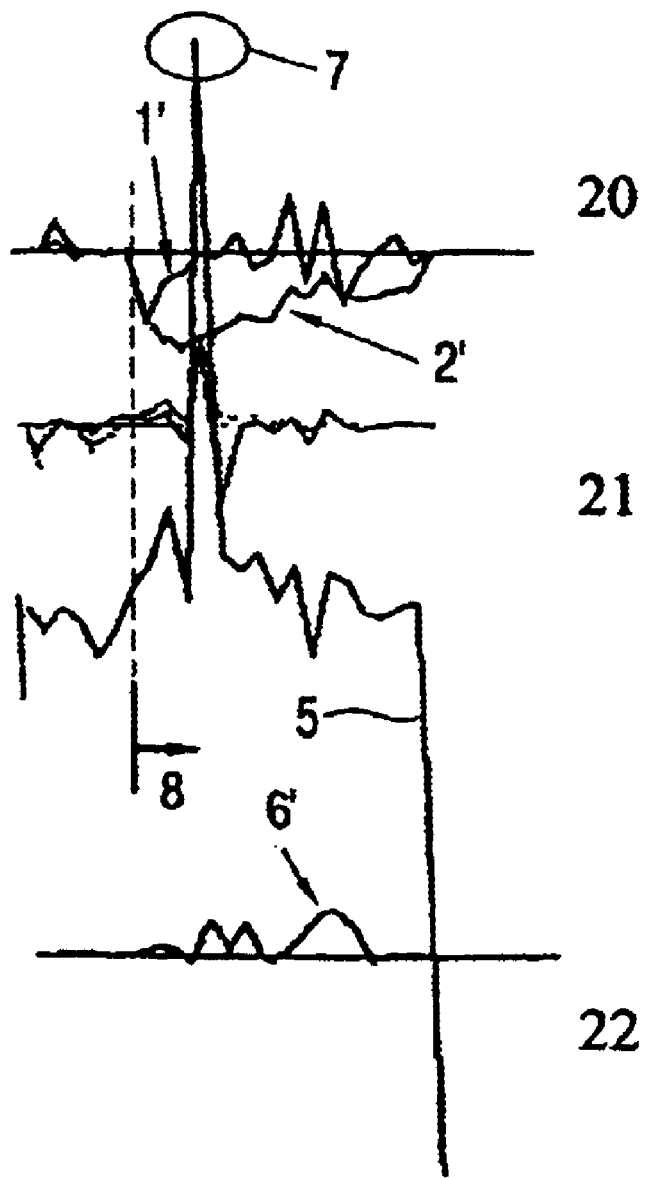
FIG. 1 is a diagram that exhibits space ranges of 134 to 135.5 degrees of east longitude, 34 to 35.5 degrees of north latitude, and 50 to 0 km depth. The lower limit was registered a magnitude of 2 and the upper limit was registered a magnitude of 9. The number of seismic events of a period is 20 events.

The detail description for each figure is explained in the embodiments.

DESCRIPTION OF THE PREFERRED EMBODIMENTS

Reference numbers shown in the drawings indicate the following meanings.

1: sr1(I), Liapunov exponent of ss1(I)
   (ss1(I) is an average of the relative distances between two sources of sequencial seismic events.)

1': srq1(I), Liapunov exponent of ssq1(I)
   (ssq1(I) is an average of the distances between each source and a base point.)

2: ssrr1(I), average of the Liapunov exponent sr1(I)

2': ssrqr1(I), average of the Liapunov exponent srq1(I)

3: er1(I), Liapunov exponent of ee1(I)

4: ssrr1(I), average of er1(I)

5: sme1(I), magnitude corresponding to ee1(I)

6: Dd1(I), value calculated by (er1(I)−er1(I+1)) (sr1(I)−sr1(I+1))

6': Ddq1(I), value calculated by (er1(I)−er1(I+1)) (srq1(I)−srq1(I+1))

7: a real extensive seismic event 8, 8', 8", 9, 9', 10, 11, 12,

13: designated range of time for seismic event data

20: the horizontal line indicating magnitude 6 for sme1(I), and indicating zero for srl(I), ssrrl(I), srql(I) and ssrgrl (I)

21: the horizontal line indicating magnitude 5 for sme1(I) and also indicating value 0 for er1(I) and ssrr1(I)

22: the horizontal line indicating value 0 for Dd1(I) and Ddq1(I), and indicating the value "2" for smel(I)

FIG. 1 is a diagram that exhibits space ranges of 134 to 135.5 degrees of east longitude, 34 to 35.5 degrees of north latitude, and 50 to 0 km depth. The lower limit was registered a magnitude of 2 and the upper limit was registered a magnitude of 9. The number of seismic events of a period is 20 events. For the term (after November 1994) indicated by a reference number 8, the graphs indicated by the reference numbers 1' and 2' indicate minus. They represent that a space change of the seismic center is reduced or converged on the range within a specific region.

Figure 2:
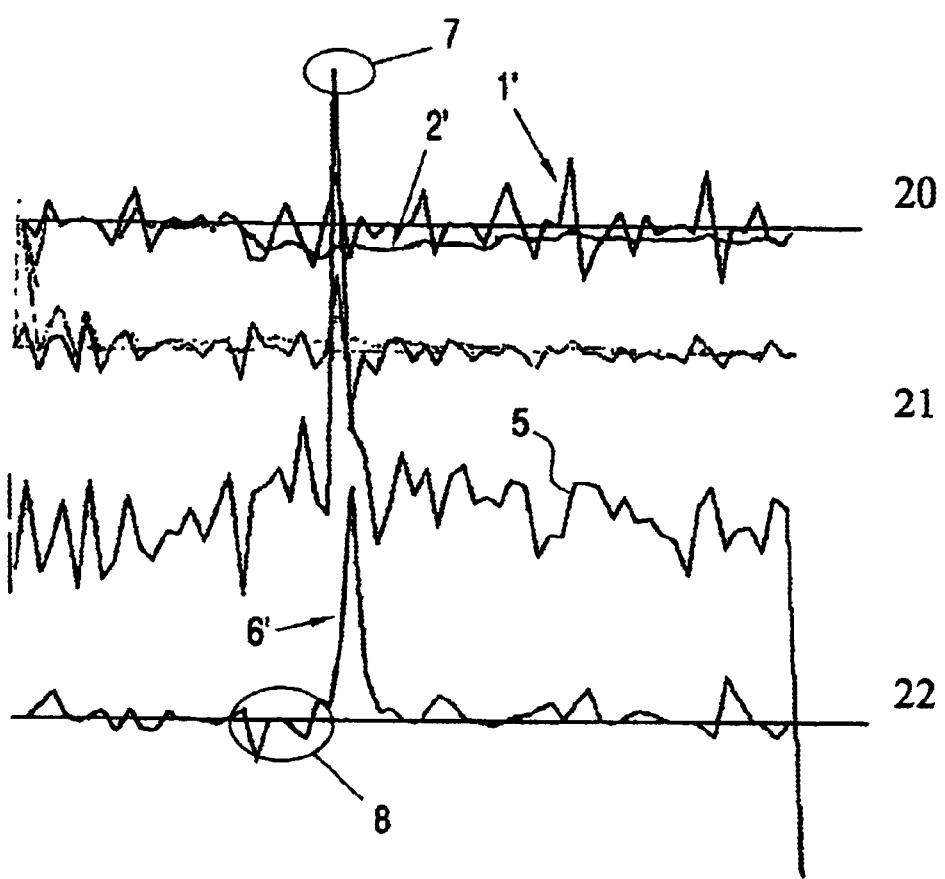
FIG. 2 is a diagram that exhibits space ranges of 134 to 135.5 degrees of east longitude, 34 to 35.5 degrees of north latitude, and 50 to 0 km depth. The lower limit was registered a magnitude of 0 and the upper limit was registered a magnitude of 9. The number of seismic events of a period is 8 events.

For FIG. 2, the space region for calculating is the same as FIG. 1, the lower limit is registered a magnitude of 0 and the upper limit thereof is registered a magnitude of 9. For the term indicated by the reference number 8 which is the same term as FIG. 1, the graph indicated by the reference number 2' indicates minus. This represents that a space change of the seismic center is reduced or converged on the range within a specific region. Further, the graph indicated by the reference number 6' of this period was changed to minus. FIGS. 1 and 2 are the results of calculation using srq1(I), ssrqr1(I), and Ddq1(I). The seismic source point of the south earthquake in Hyogo Prefecture is used as the first fiducial point of space.

Figure 3:
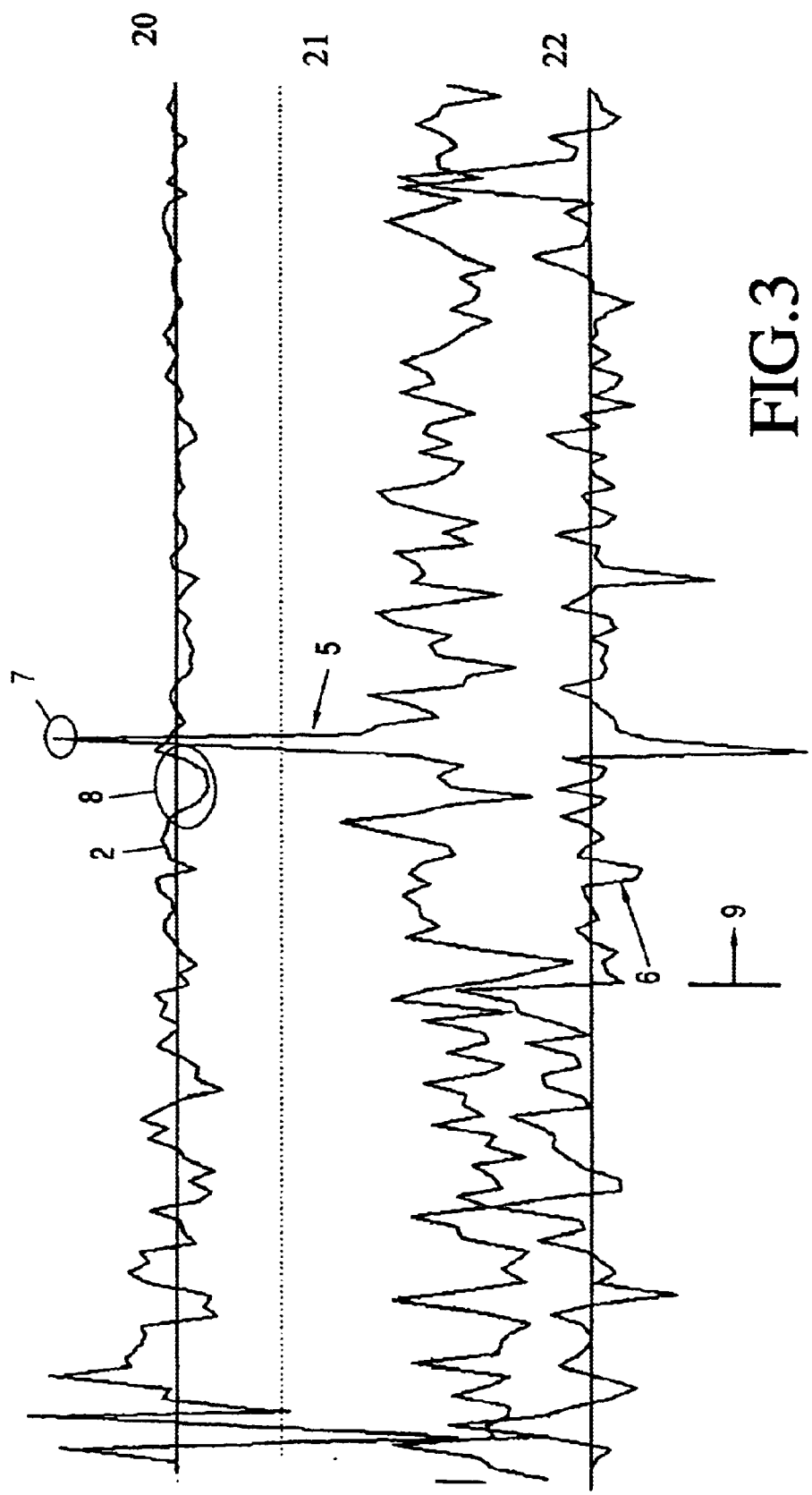
FIG. 3 is a diagram that exhibits space ranges of 134 to 135.5 degrees of east longitude, 34 to 35.5 degrees of north latitude, and 50 to 0 km depth. The lower limit was registered a magnitude of 2 and the upper limit was registered a magnitude of 9. The number of seismic events of a period is 3 events.

FIG. 3 is a graph in which the region of the space for calculating is 134 to 135.5 degrees of east longitude, 34 to 35.5 degrees of north latitude, and 50 to 0 km depth. The lower limit was registered a magnitude of 2 and the upper limit was registered a magnitude of 9. The number of seismic events of a period is 3 events. For the term (from Dec. 3, 1994 to Jan. 17, 1995) indicated by the reference number 8, the graph indicated by the reference numbers 2 indicates minus. This represents that a space change of the seismic center is reduced or converged on the range within a specific region. For the term (after 1994 November) indicated by the reference number 9, the graph indicated by a reference number 6 is not the same as before.

Figure 4:
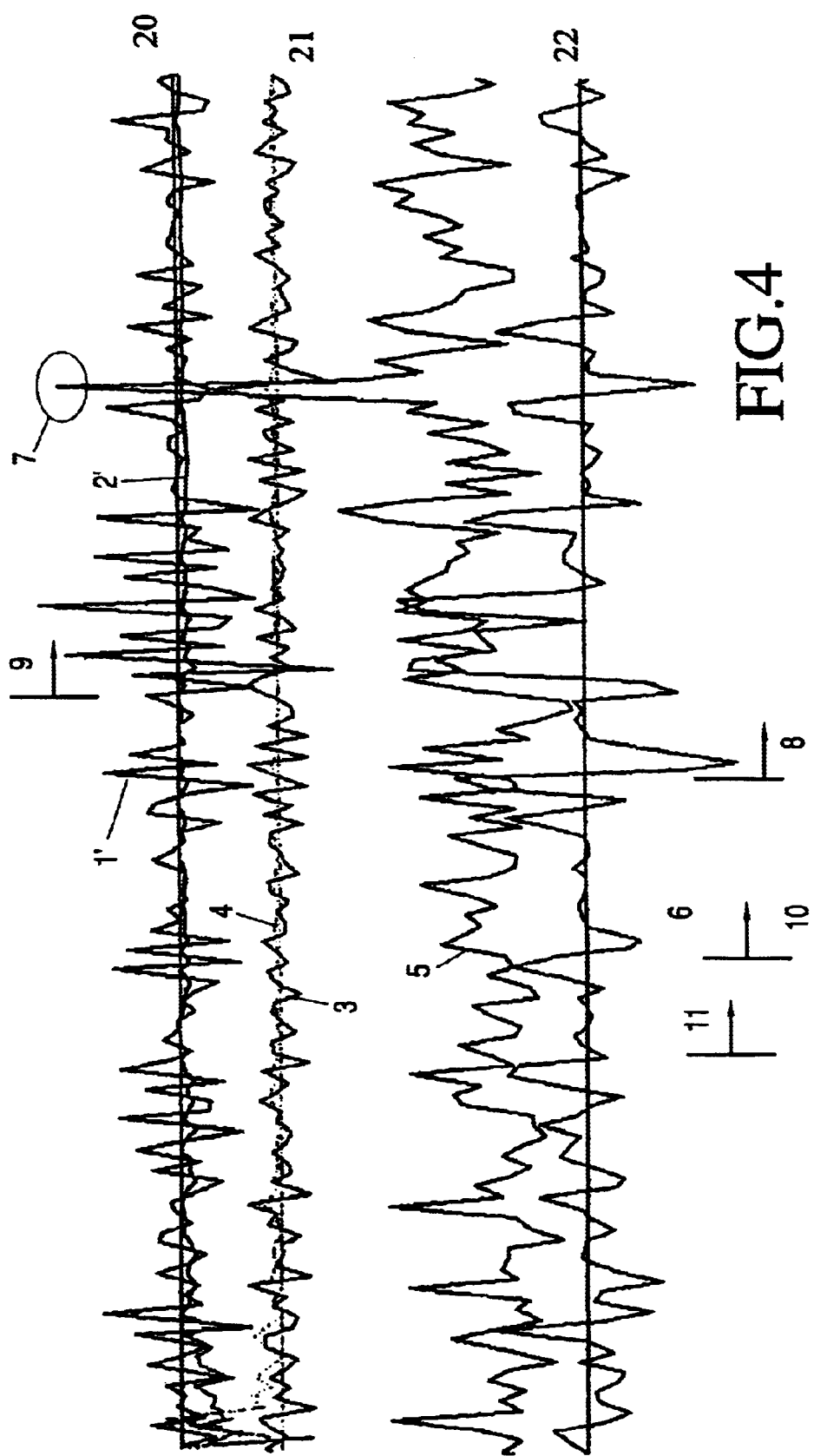
FIG. 4 is a diagram that exhibits space ranges of 134 to 135.5 degrees of east longitude, 34 to 35.5 degrees of north latitude, and 50 to 0 km depth. The lower limit was registered a magnitude of 0 and the upper limit was registered a magnitude of 9. The number of seismic events of a period is 2 events.

FIG. 4 is a graph in which the region of the space for calculating is 134 to 135.5 degrees of east longitude, 34 to 35.5 degrees of north latitude, and 50 to 0 km depth. The lower limit was registered a magnitude of 0 and the upper limit was registered a magnitude of 9. The number of seismic events of a period is 2 events. For the term, that is to say, from 1994 October, indicated by a reference number 9, the graph indicated by the reference numbers 2' indicates minus. This represents that a space change of the seismic center is reduced or converged on the range within a specific region. For the term (after 1994 July) indicated by the reference number 8, the graph indicated by the reference number 6' has not been shown before. A reference number 10 indicates a term after June 1993. A reference number 11 indicates a term after April 1993.

Figure 5:
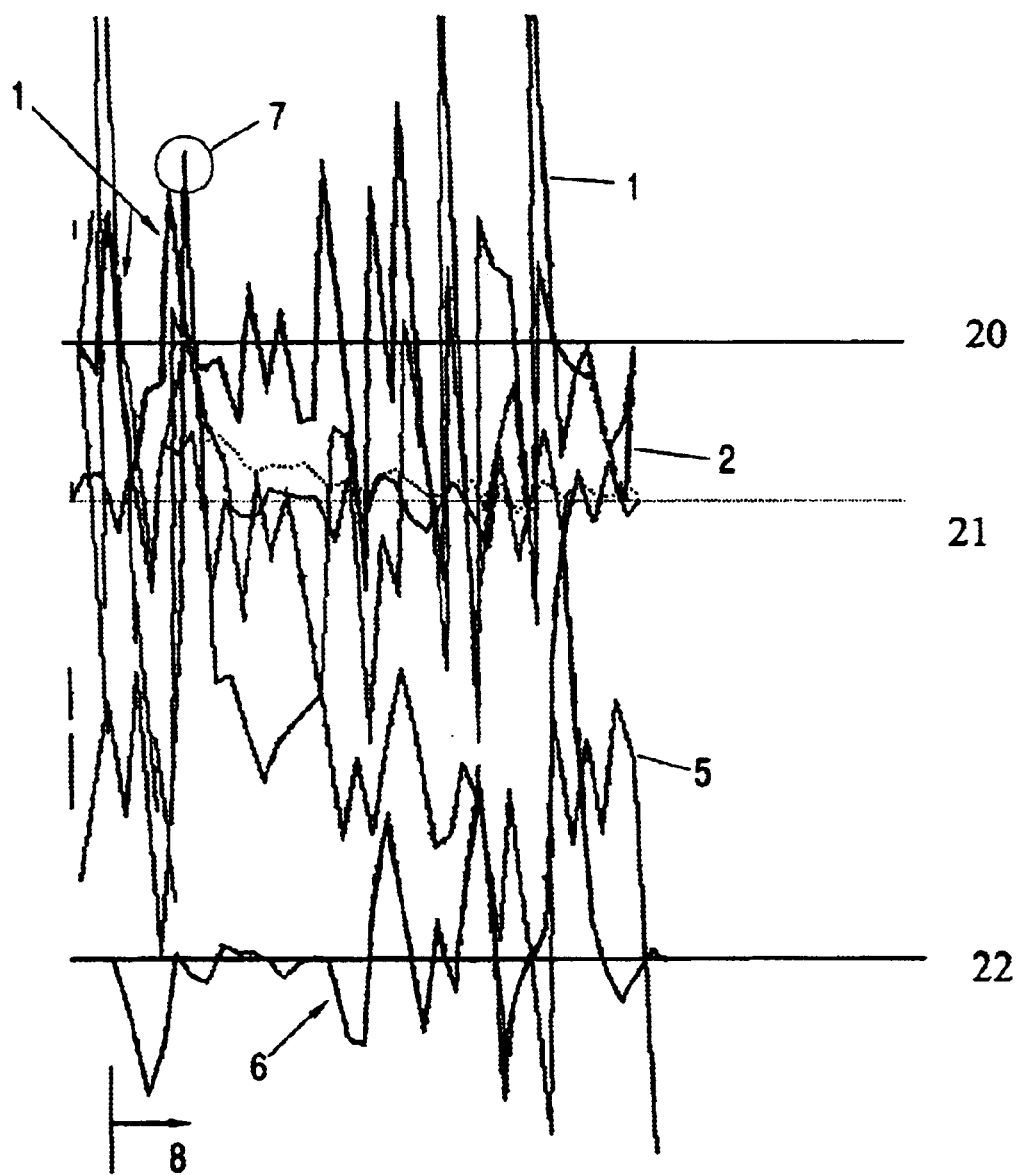
FIG. 5 is a diagram that exhibits space ranges of 134 to 135.5 degrees of east longitude, 34 to 35.5 degrees of north latitude, and 50 to 10 km depth. The lower limit was registered a magnitude of 0 and the upper limit was registered a magnitude of 9. The number of seismic events of a period is 2 events.

FIG. 5 is a graph in which the region of the space for calculating is 134 to 135.5 degrees of east longitude, 34 to 35.5 degrees of north latitude, and 50 to 10 km depth. The lower limit was registered a magnitude of 0 and the upper limit was registered a magnitude of 9. The number of seismic events is indicated in a range indicated by the reference number 8 by calculating using 2 events. For the term before a real seismic event, from 1994 October to 1995 January before the real seismic event, the graph indicated by the reference number 6 indicates minus. Though a figure is not shown, in the case in which the number of seismic events for a period is defined as 1 and the same space is set, the graph indicated by the reference number 6 indicated minus. For this area, for a period of time from the year 1992 to the year 1995 of the south earthquake in Hyogo Prefecture, the earthquakes were frequently caused in an area the depth of which was shallower than 10 km.

The common thing is that spatial shifts of the seismic source area for the graphs indicated in the reference numbers 2 or 2' after 1994 October were reduced or converged on the range within a specific region. Further, it was also found that the graphs indicated by the reference numbers 6 and 6' in the figures respectively were not the same before and after October 1994 (the tendency of taking minus values was frequently found). If the number of the events was changed, a stable condition was not obtained for the graphs indicated by the reference numbers 6 and 6' for more than 4 events. However, a stable condition was obtained for the graphs indicated by the reference number 2 or 2' in relation to the spatial characteristics.

For calculation using this area and data from 1992 September to 1995 February, latitude and longitude are the same as FIGS. 1 to 5. Further, there was not caused a big erroneous effect even if 0.5° latitude and longitude were further expanded to the region. Further, for calculating to this region, a calculating method using srq1(I), ssrqr1(I), and Ddq1(I) were effectively performed in a view point of prediction if the depth was set as 0 to 50 km.

Further, in the case in which the depth was set as 10 to 50 km if sr1(I), ssrr1(I), and Dd1(I) were used, effective calculation were performed. In the case in which srq1(I), ssrqr1(I), and Ddq1(I) were used, the value of the seismic source point of the south earthquake in Hyogo Prefecture is used as the fiducial point of space which had to be set for the first time.

Inversely speaking, if the first fiducial point of space is set near the seismic source point which was predicted in advance, the calculating method may be well performed using srq1(I), ssrqr1(I), and Ddq1(I).

A seismic fault face was caused in the surface of the earth of the south earthquake in Hyogo Prefecture and it was a fault type which was shifted in the lateral direction.

Figure 6:
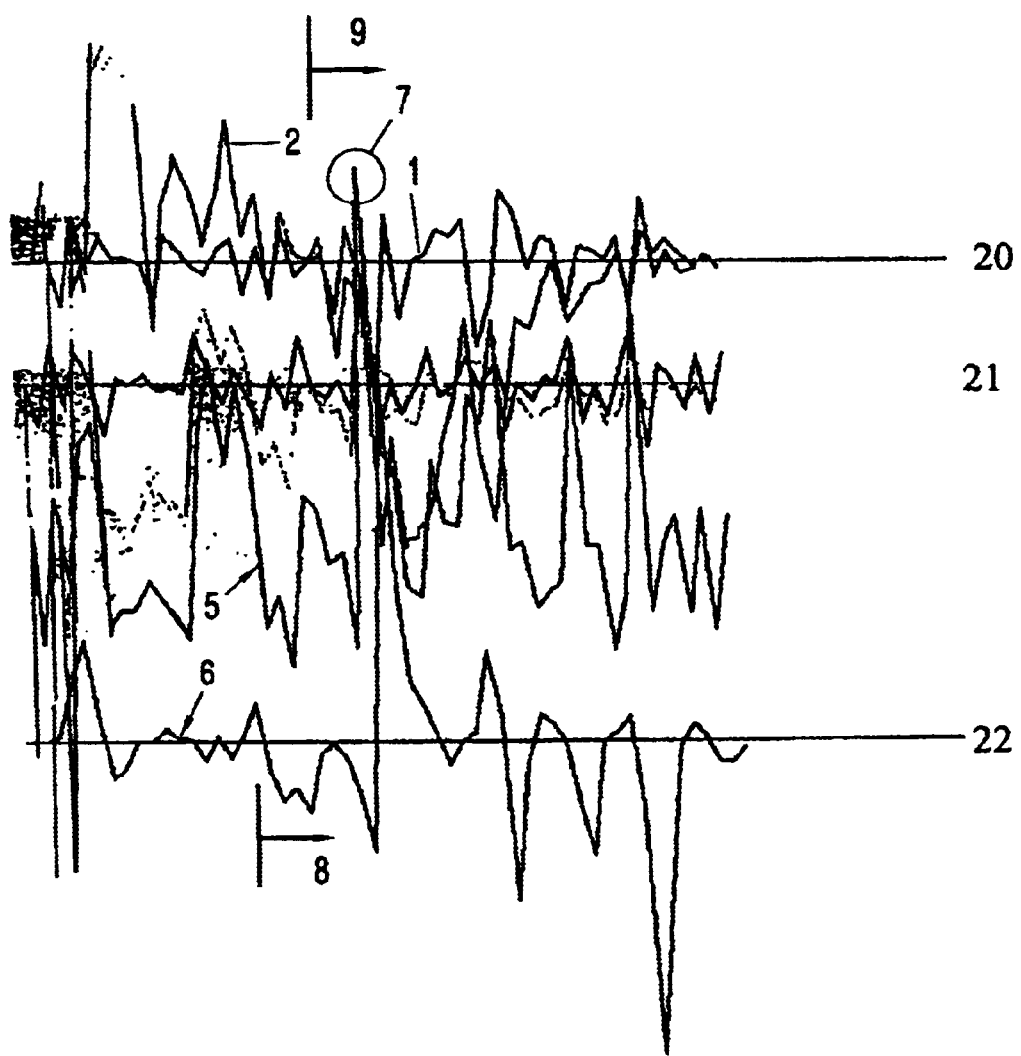
FIG. 6 is a diagram that exhibits space ranges of 131.5 to 134.7 degrees of east longitude, 32.2 to 34.7 degrees of north latitude, and 90 to 20 km depth. The lower limit was registered a magnitude of 2 and the upper limit was registered a magnitude of 9. The number of seismic events of a period is 8 events.

FIG. 6 is a graph in which the region of the space for calculating is 131.5 to 134.7 degrees of east longitude, 32.2 to 34.7 degrees of north latitude, and 90 to 20 km depth. The lower limit was registered a magnitude of 2 and the upper limit was registered a magnitude of 9. The number of seismic events of a period is 8 events.

For the term, which is before a real seismic event from Mar. 6, 2001 to Mar. 24, 2001, indicated by a reference number 8, the graph indicated by the reference numbers 6 indicates a tendency of minus when the term before the term thereof is compared. For the term (after Mar. 12, 2001) indicated by the reference number 9, the graph indicated by the reference number 2 comes to be minus.

Figure 7:
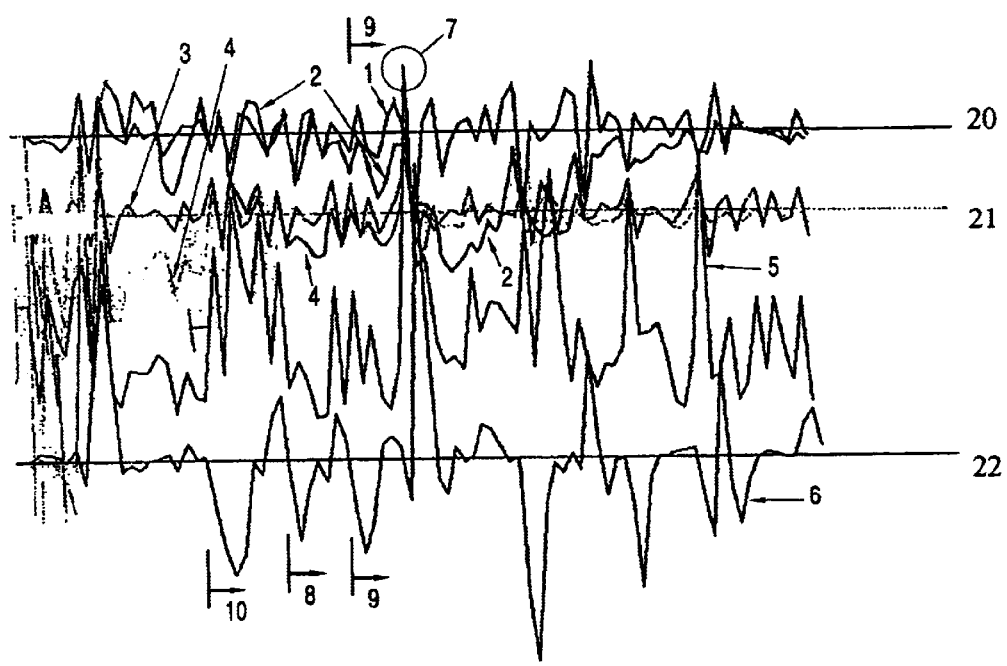
FIG. 7 is a graph in which latitude, longitude, and depth are set in the same way as FIG. 6, and the lower and upper limits of magnitude are the same as FIG. 6, and the number of seismic events for the period is 5 events.

FIG. 7 is a graph in which latitude, longitude, and depth of the seismic source for calculating are set in the same way as FIG. 6 and the lower and upper limits of magnitude are the same as FIG. 6, and the number of seismic events for the period is 5.

For the term, which is before a real seismic event from Mar. 6, 2001 to Mar. 24, 2001, indicated by a reference number 8, the graph indicated by the reference numbers 6 indicates a tendency of minus when the term before the term thereof is compared. For the term (after Mar. 12, 2001) indicated by the reference number 9, the graph indicated by the reference number 2 comes to be minus. After the term indicated by the reference number 10 for indicating Feb. 6, 2001 the graph indicated by the reference number 6 indicates minus.

Figure 8:
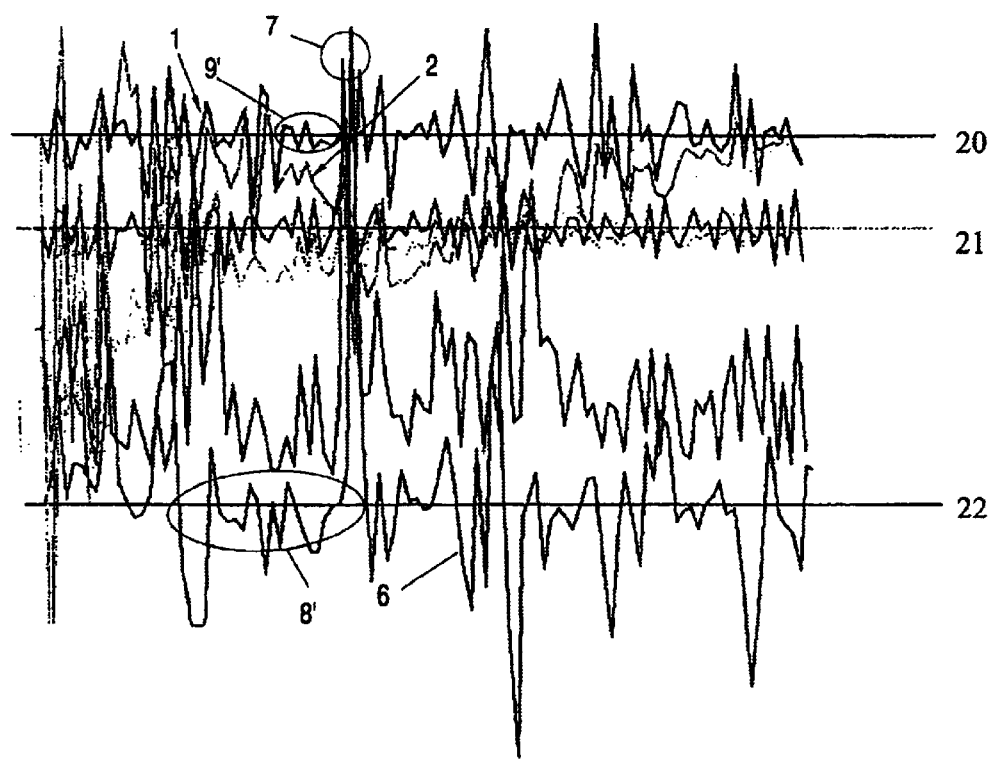
FIG. 8 is a graph in which latitude and longitude are set in the same way as FIG. 6 and the lower and upper limits of magnitude are the same as FIG. 6, depth is set as 30 to 60 km, and the number of seismic events for the period is 3 events.

FIG. 8 is a graph in which latitude and longitude for calculating are set in the same way as FIG. 6 and the lower and upper limits of magnitude are the same as FIG. 6, depth is set as 30 to 60 km, and the number of seismic events for the period is 3. For the term, which is before a real seismic event from Feb. 8, 2001 to Mar. 24, 2001, indicated by a reference number 8', the graph indicated by the reference numbers 6 indicates a tendency of minus when the term before it is compared. For the term (after March 22) indicated by the reference number 9', the graph indicated by the reference number 2 comes to be minus. For the term indicated by the reference number 9', the graph indicated by the reference number 1 indicates a tendency of 0 or minus. It is Feb. 6, 2001.

Figure 9:
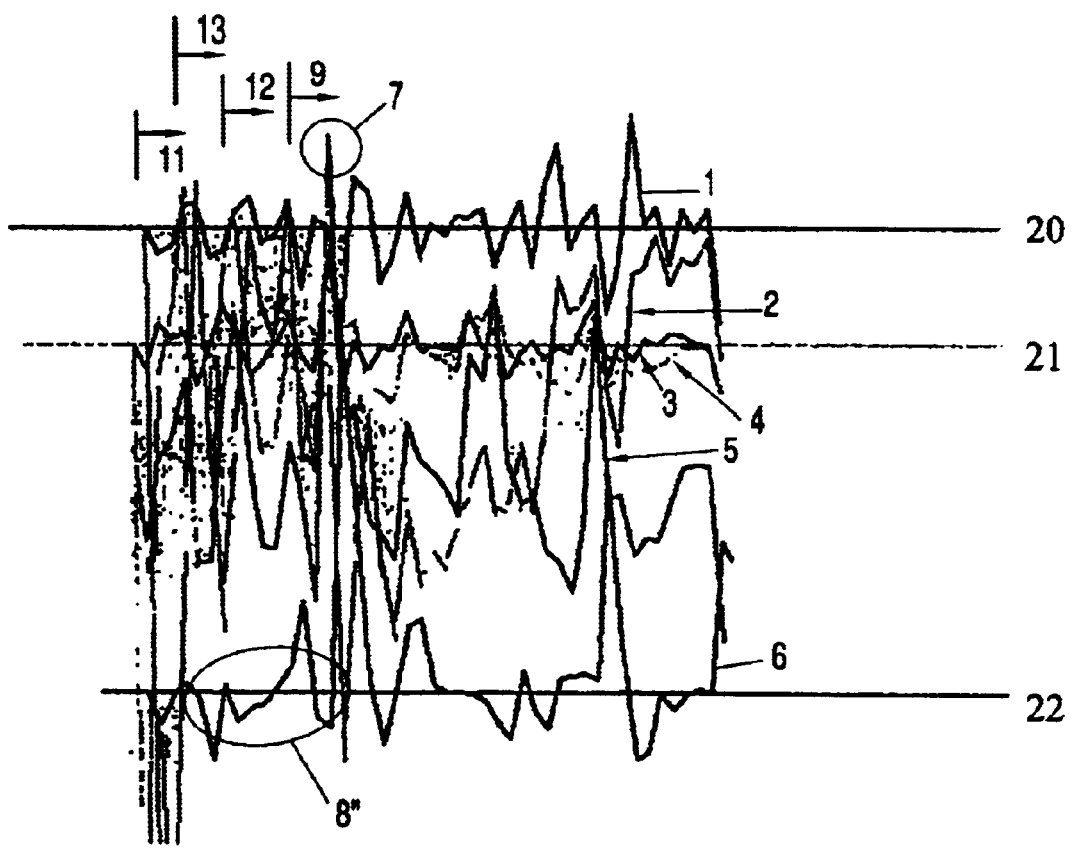
FIG. 9 is a graph in which the scope of latitude and longitude is set as (N33°−N34.7°, 131.5° E−133° E), depth and the lower and upper limits of magnitude are the same as FIG. 6, and the number of seismic events for the period is 4.

FIG. 9 is a graph in which the scope of latitude and longitude for calculating is set as (33° N–34.7° N, 131° E–133° E), the limit of depth and the lower and upper limits of magnitude are the same as FIG. 6, and the number of seismic events for the period is 4. For the term, which is before a real seismic event from Feb. 6, 2001 to Mar. 24, 2001 indicated by a reference number 8', the graph indicated by the reference numbers 6 indicates a tendency of minus when the term before it is compared. For the term (the same as FIG. 6) indicated by the reference number 9, the graph indicated by the reference number 1 indicates a tendency of 0 or minus. The graph indicated by the reference number 11 indicates the term after the initial day of March 2001. The graph indicated by the reference number 12 indicates the term after March 2001. The graph indicated by the reference number 13 indicates the term after 2001 January. By setting latitude and longitude as the same as FIGS. 6 to 8, in the case in which depth is set as 30 to 60 km and in the case in which depth is set as 20 to 90 km, the characteristics of the graph indicated by the reference number 6 are the same.

By setting the limit of depth, the upper and lower limits of magnitude, and the condition of FIG. 6 as constant and by setting latitude and longitude as (33° N–34.7° N, 131.5° E–133° E), even if the number of the seismic events for the period is changed from 3 to 10, the characteristics of the graph indicated by the reference number 6 are the same. Further, the graph indicated by the reference number 2 which indicates the spatial characteristic of the seismic source for the term (before the first term of the real earthquake in March 24 for respective figures, in general, from February of the same year to the term before the real earthquake in March) indicated by the reference numbers 8, 8' and 8" is minus.

For calculating the term (after 2000 October) in this area, the method in which the seismic source point, which is identified later using srq1(I), ssrqr1(I), and Ddq1(I), is defined as the first spatial base is not so clearer than the method using sr1(I), ssrr1(I), and Dd1(I).

The real quake of this earthquake is Ms6.4 called GEIYO JISHIN in Mar. 24, 2001. This is a tension type normal fault. Depth of the seismic source thereof is 60 km.

For the spatial range for calculating for FIGS. 10 to 14, east longitude is 28 to 31 degrees, north latitude is 38 to 41 degrees, depth is 50 to 0 km, the lower limit of magnitude is 0, and the upper limit of magnitude is 9.

The term indicated by the reference number 8 is the term after Aug. 1, 1999. The term indicated by the reference number 9 is the term after Aug. 7, 1999. The range of the term indicated by the reference number 8 and the range of the term indicated by the reference number 9 are commonly the same as FIGS. 10 to 14. The period for calculating is from 1999 January. For the seismic activity in this spatial range, the term indicated by the reference number 10 is the term after 1999 July. The term indicated by the reference number 11 is the term after June. 1999.

Figure 10:
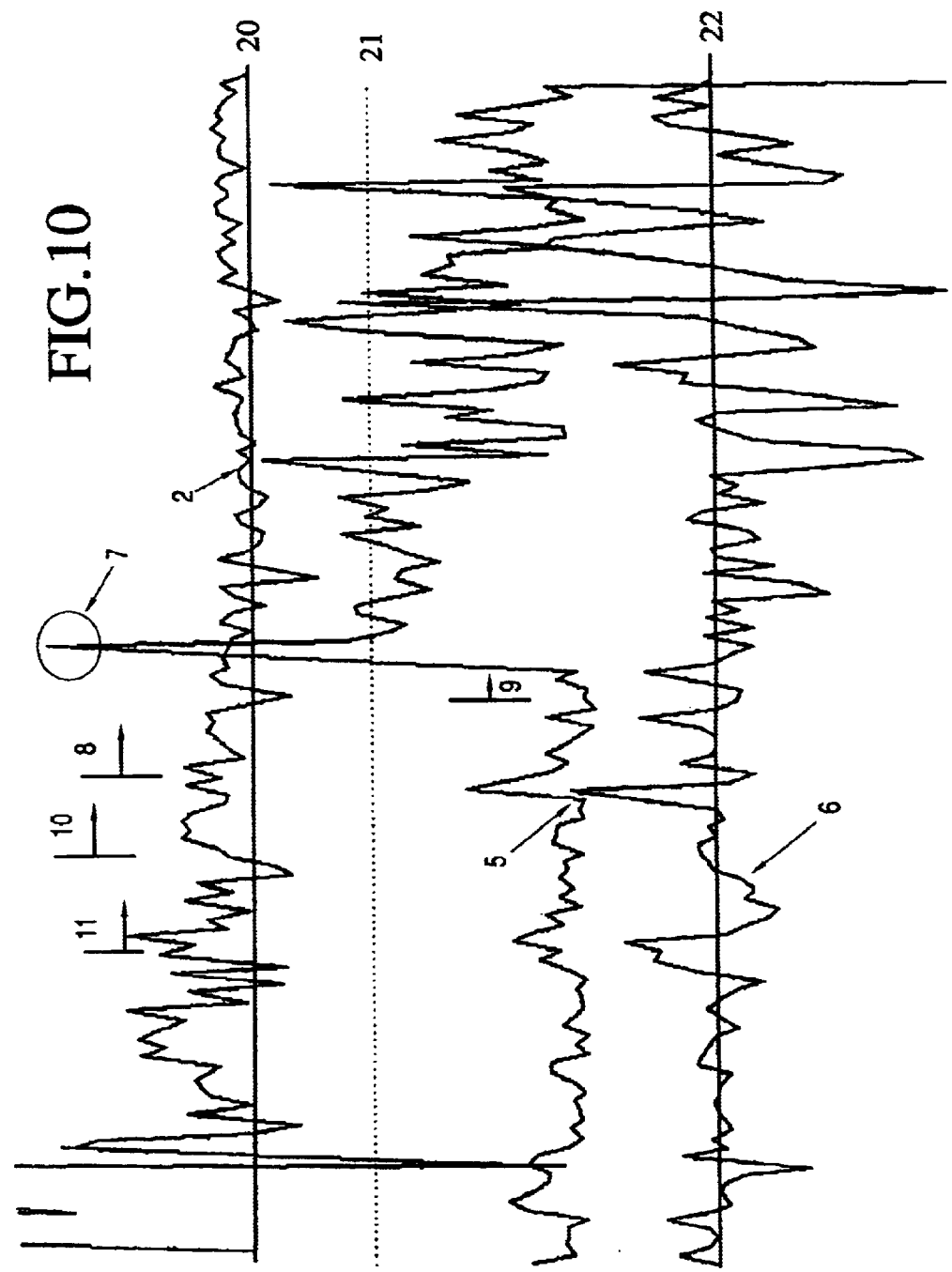
FIGS. 10 to 14 are diagrams that exhibit space ranges of 28 to 31 degrees of east longitude, 38 to 41 degrees of north latitude, and 50 to 0 km depth. The lower limit was registered a magnitude of 0 and the upper limit was registered a magnitude of 9.

For FIG. 10, the number of the seismic events for the period is 5 events.

Figure 11:
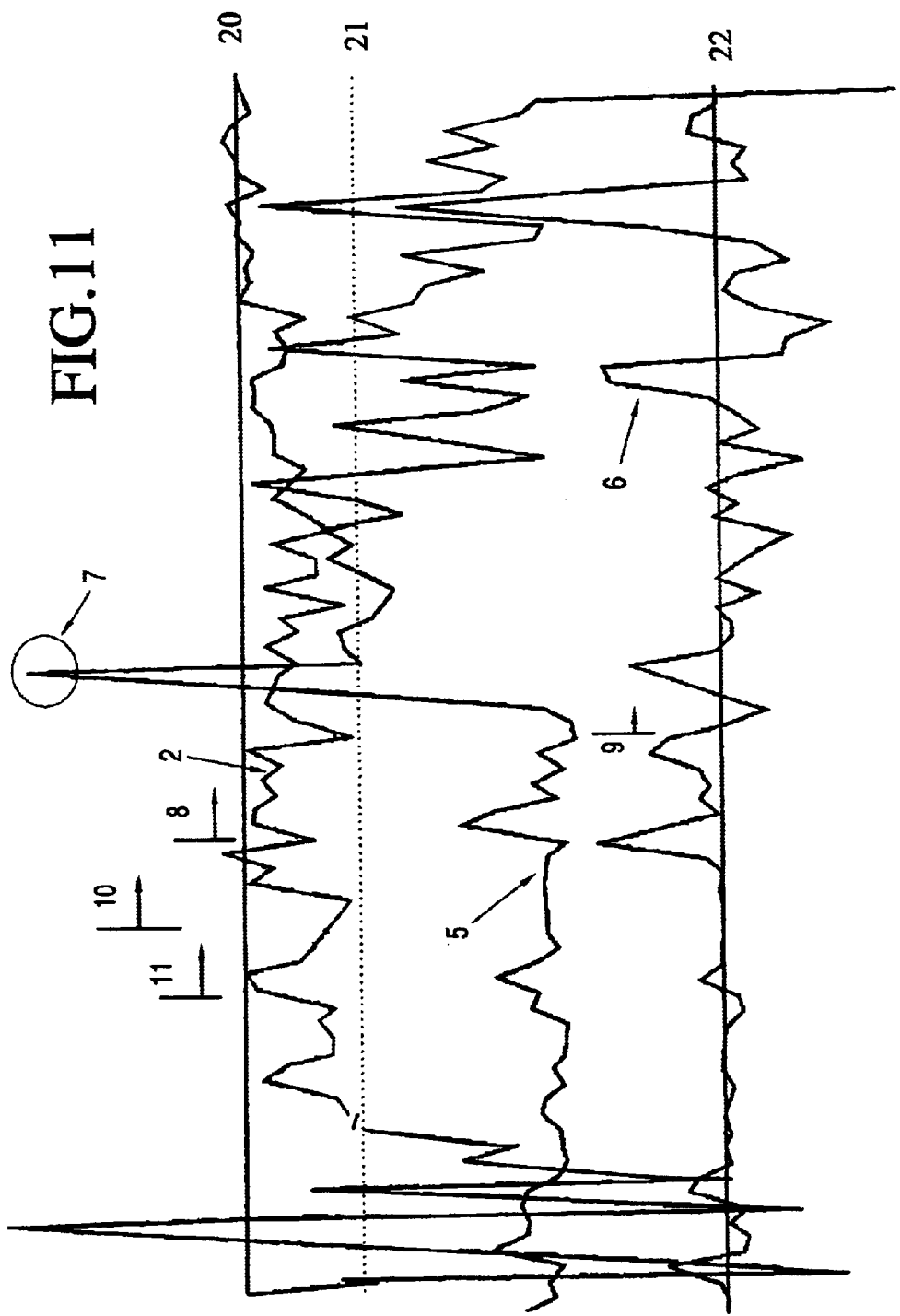

For FIG. 11, the number of the seismic events for the period is 8 events.

Figure 12:
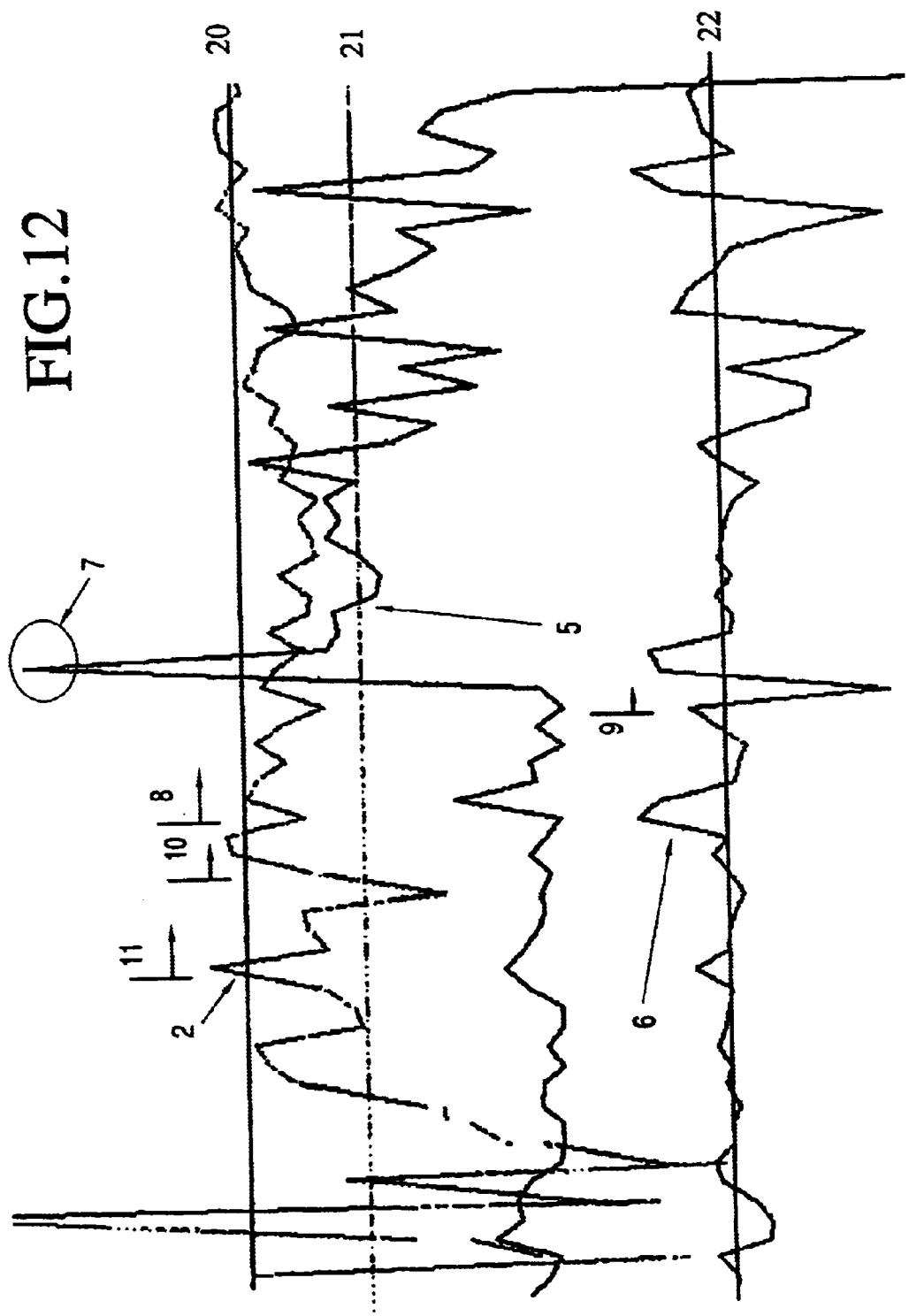

For FIG. 12, the number of the seismic events for the period is 10 events.

Figure 13:
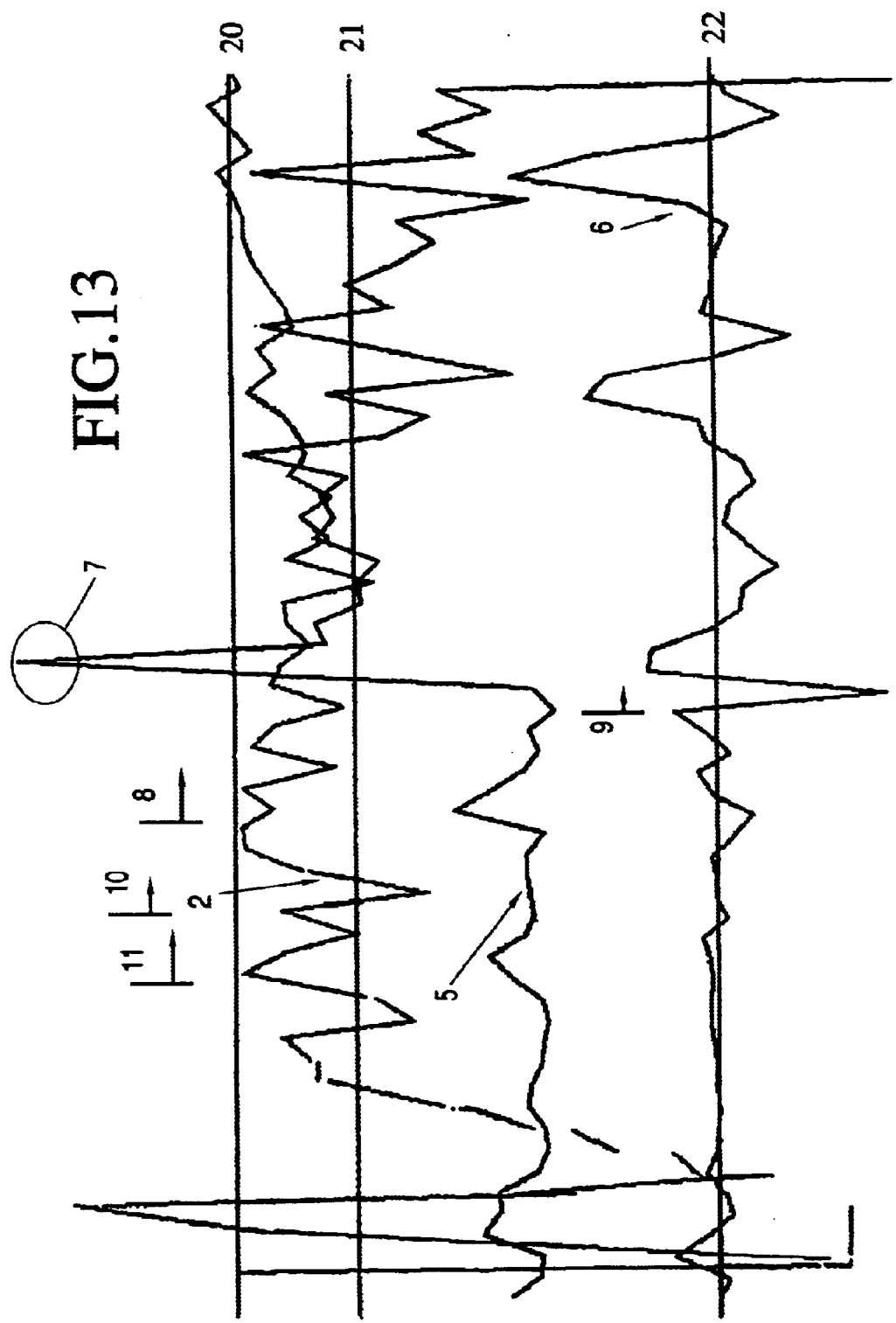

For FIG. 13, the number of the seismic events for the period is 11 events.

After the term indicated by the reference number 8 with commonly reference to FIGS. 10, 11, 12, and 13, it is indicated for coefficients in relation to the spatial characteristics indicated by the reference number 2 that the region of the seismic resource is reduced or converged on the range within the specific region. After the term indicated by the reference number 9 after Aug. 7, 1999 the graph indicated by the reference number 6 indicates the tendency of minus values. Before and after the term indicated by the reference number 8, especially the characteristics of the graph indicated by the reference number 6 are not the same.

Figure 14:
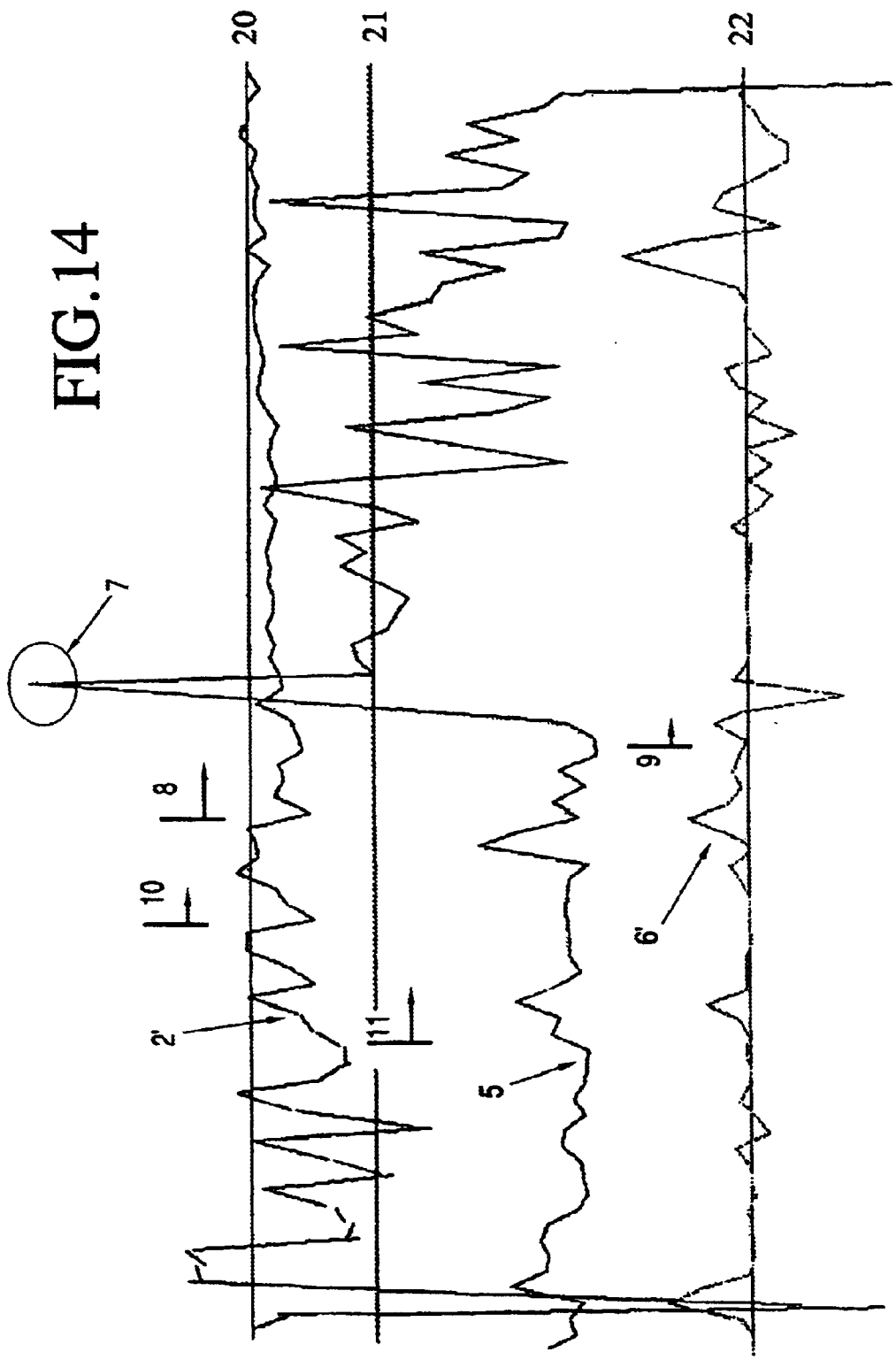

For FIG. 14, if the seismic source which was identified after the proper time was set as the first spatial base, the characteristics indicated by the reference number 2' for the spatial characteristics of the seismic source indicated by ssrqr1(I) indicated the tendency of reducing or a specific area from June 11 indicated by the reference number 8'. The number of the seismic events for the calculation period is 8. Even if other conditions are defined as the same, not shown in figures, by setting the limit of depth as 40 to 0 km on the calculation condition of FIGS. 10 to 13, the characteristic (having the minus values or the tendency of time sequence different apparently from the term before the term indicated by the reference number 8) of the graph indicated by the reference number 6 and Dd1(I) in the same term after August 1 is not changed.

In FIG. 14, the characteristics of the graph indicated by the reference number 2' had the tendency of minus, in other words, reducing the space for the seismic source, after middle of June in 1999 indicated by the reference number 8'. Even if the number of the seismic events for calculating in FIG. 14 is increased to 20, the characteristics thereof are not changed. The limits of the spatial region, latitude, longitude, depth, and magnitude are the same as FIGS. 10 to 14. The real earthquake of the 17th day of August was a right lateral displacing type of 17 km depth and Ms7.4.

Figure 15:
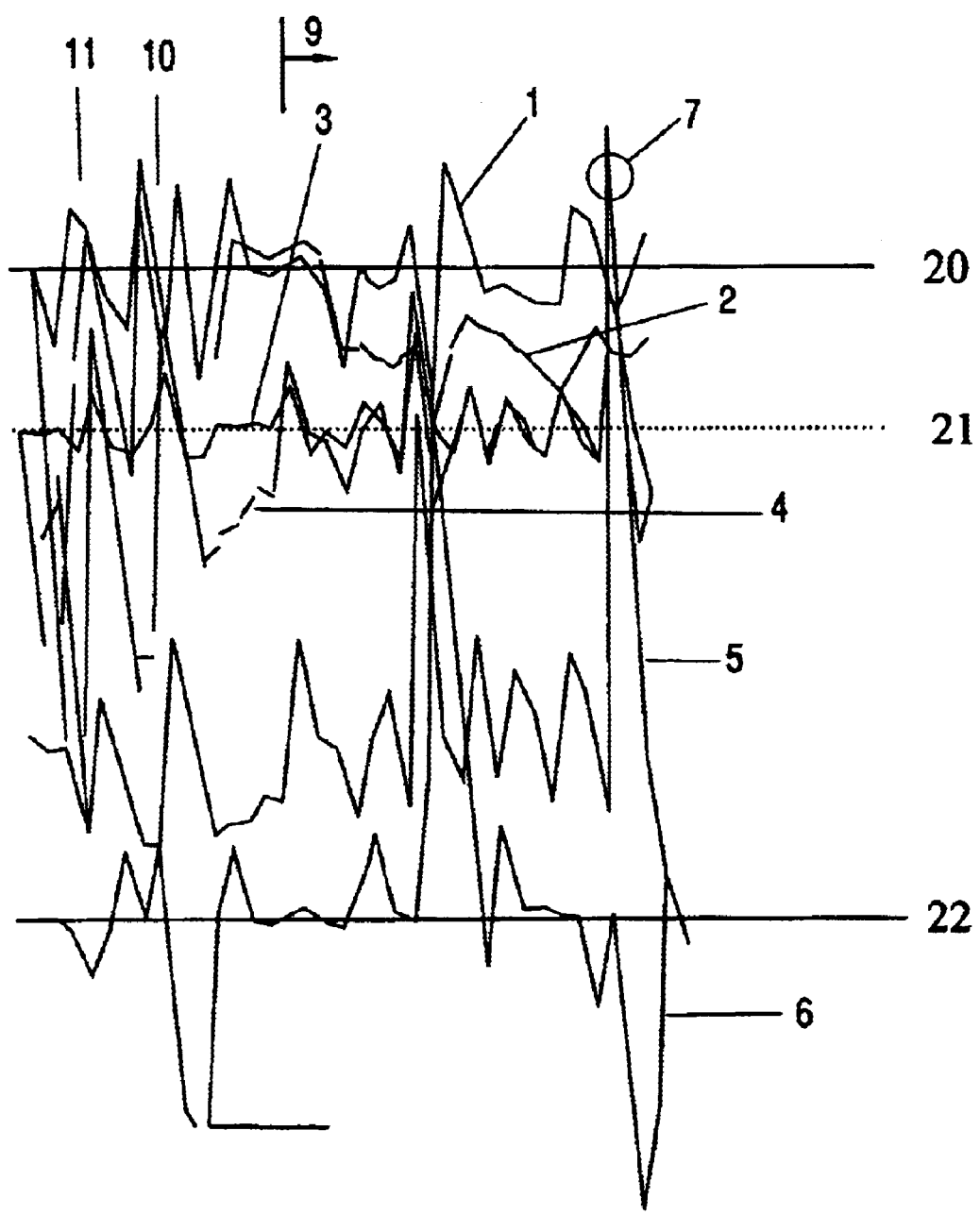
FIG. 15 is a diagram that exhibits space ranges of latitude N46°−N49°, N120° W−124° W longitude, and 20 to 90 km depth. The lower limit was registered a magnitude of 0 and the upper limit was registered a magnitude of 9. The number of seismic events of a period is 3.

FIG. 15 is a graph in which the range of the target for calculating is latitude N46°–N49°, longitude N120° W–124° W, 20 to 90 km depth. The lower limit was registered a magnitude of 0 and the upper limit was registered a magnitude of 9. The number of seismic events for the calculation period is 3. In the seismic activity of M6.8, which is caused in the state of Washington in Feb. 28, 2000 it is thought in accordance with the results of calculation that the earthquake (45.19° N, 129.12° W, 5.1) which occurred in Jan. 30, 2000 corresponds to a pre-earthquake as used in seismology (with reference to the seismic data of the University in the state of Washington). The graph indicated by the reference number 10 indicates 1996 November and the graph indicated by the reference number 11 indicates 1995 December. In the term after the term (from 2000 September to Feb. 28, 2001) indicated by the reference number 8, though the numeric values indicated by the reference number 6 have the tendency of having minus values, if the upper and lower limits of depth are 90 to 20 km, 80 to 20 km, and 70 to 30 km respectively, the results of calculation are stable. In the case in which the number of seismic events for the period is changed, though unstable condition is caused, the same basic tendency, in which Ddq1(I) is negative after 2000 September, can be obtained. For the term indicated by the reference number 9 of FIGS. 15 and 16, the results of calculation in relation to the spatial characteristics of the seismic source of the graph indicated by the reference number 2 indicates, by way of the earthquake of 45.19° N, 120.1° W, M5.1, from 1997 December to Jan. 30, 2000 that the seismic source was reduced or in the range within a specific region for the term up to the time of the earthquake in Feb. 28, 2001 occurred.

Figure 16:
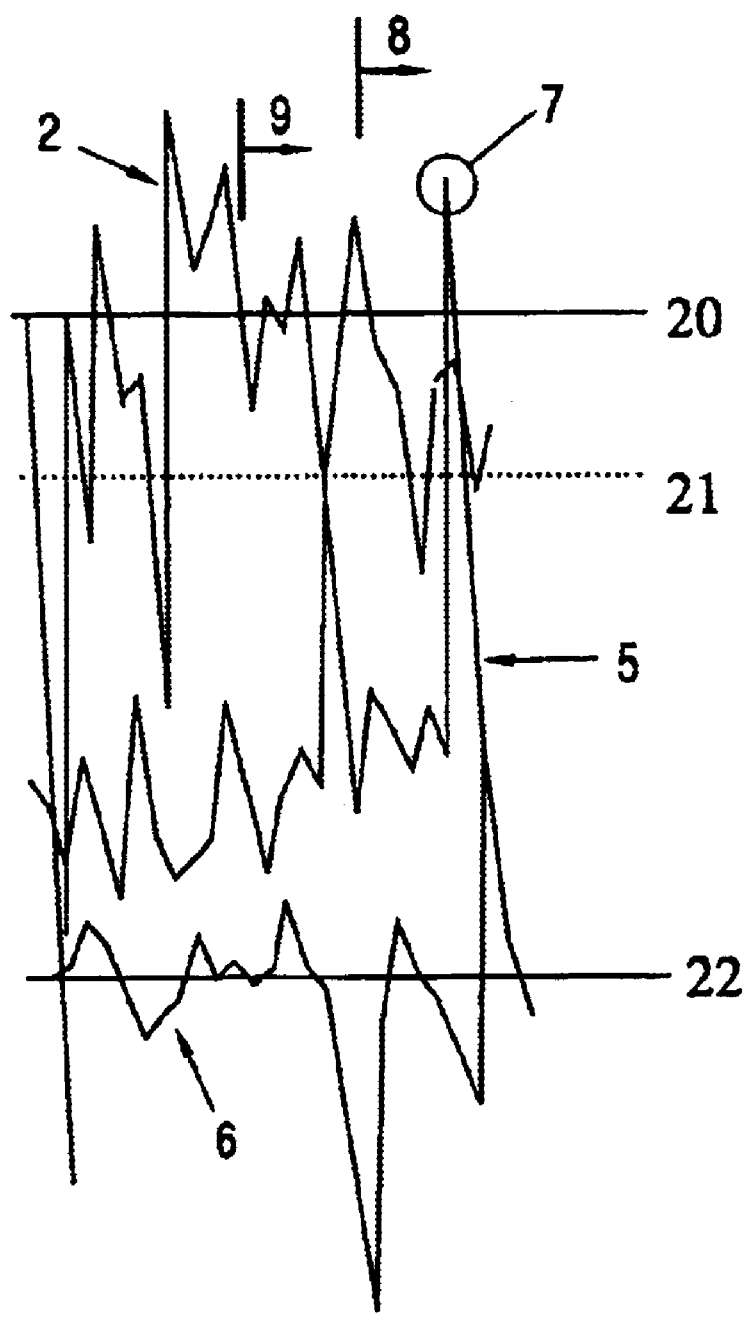
FIG. 16 is a diagram that exhibits space ranges of latitude N46°−N49°, 120° W−124° W longitude, and 20 to 80 km depth. The lower limit was registered a magnitude of 0 and the upper limit was registered a magnitude of 9. The number of seismic events of a period is 4.

FIG. 16 is a graph in which the range of the target for calculating is latitude N46°–N49°, longitude 120° W–124° W, 20 to 80 km depth. The lower limit was registered a magnitude of 0 and the upper limit was registered a magnitude of 9. The number of seismic events for the calculation period is 4. The term after the term indicated by the reference number 8 is the same as the term of FIG. 15. The term indicated by the reference number 9 is the same as the term of FIG. 15. The spatial characteristics indicated by the reference number 2 have minus as well, and this has the same tendency as FIG. 15. In this calculating method, the same tendency is caused with reference to the graph indicated by the reference number 2 up to the time that the number of seismic events for the calculation period is 2 to 6. For the graph indicated by the reference number 6, the same tendency is caused up to the time that the number of seismic events for the calculation period is 1 to 4.

Figure 17:
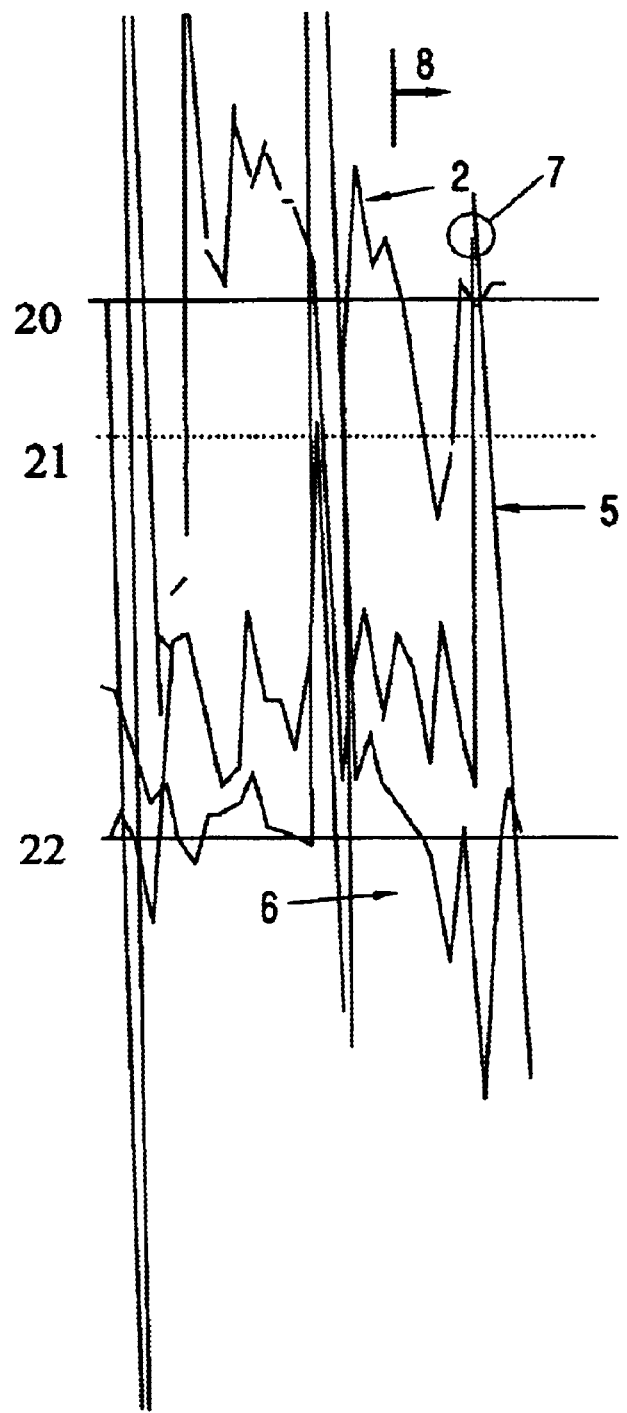
FIG. 17 is that the condition is the same as FIGS. 16 and 17 except that the number of the periods of seismic events is 2.

For FIG. 17, the condition is the same as FIGS. 16 and 17 except that the number of the periods of seismic events is 2. The term indicated by the reference number 8 indicates the term after 2000 September. The term indicated by the reference number 9 indicates the term after 1997 December. Ddq1(I) indicated minus up to the time of the real earthquake from 2000 September to 2001 February when the number of the seismic events for the period was 3 and 4, in the case in which latitude and longitude were set to be the same by defining depth of the target for calculating as 25 to 85 km by way of calculation in which the spatial base (as the seismic source which is identified after the proper time) which should be set for the first time was set using ssrqr1(I) and Ddq1(I). However, srq1(I) did not indicate a remarkable change up to the time of the pre-earthquake to the real earthquake. It has been thought that the real earthquake is Ms6.8, 52 km depth, and a normal fault inside a sub-production plate.

In Taiwan, for the earthquake occurred in Sep. 21, 1999 though a figure is not provided, in calculating sr1(I), ssrr1(I), and Dd1(I) using 120 to 122 degrees of east longitude and 22 to 26 degrees of north latitude, stably for depth 0 to 70 km and 0 to 30, up to time that the number of events per the period is 3 to 7, the same basic tendency is obtained for Dd1(I) at the same period. The spatial characteristics for ssrr1(I), which is indicated by the reference number 2, are not obvious. (However, the tendency in which the seismic source region is enlarged is not recognized.) The real earthquake, Ms7.6, 5 km depth, caused a reverse fault compressing east and west.

In the case in which basically the tendency for sr1(I), ssrr1(I) or srq1(I) and ssrqr1(I) in relation to the spatial distribution of the seismic source to have minus or 0, that is to say, the tendency for the seismic source of each earthquake to shift to a small extent and also for the values of Dd1(I) or Ddq1(I) to have minus, is recognized for data at the same period even if the number of periods of the seismic events for calculating is changed and even if depth (it is preferred to include the upper and lower limits of depth of the supposed seismic fault face) is changed in the area of the supposed seismic source, it is possible to recognize that the spatial region thereof is a seismic shell condition for causing the earthquake more than M6. Especially when the values of srq1(I) and ssrqr1(I) are considered, it is easily recognized for the seismic source to come into being converged especially if the limit of depth is changed to a wide area rather than sr1(I) and ssrr1(I).

Further, in the case of obtaining the results of satisfying the aforementioned condition described in the above paragraph, it should be examined closely that the region thereof is defined as a seismic blank region or geophysically the supposed seismic source region is not nonsense, According to the methods thereof, it may be caused to output a sign of the earthquake of M5.5. This is the case in which the graph indicated by the reference number 1 has the value of 0 or minus and the graph indicated by the reference number 6 has the value of minus or the value more nearly equal to 0 compared with the graph indicated by the reference number 6 or 6' before the period thereof, after the earthquake of more or less M4 is caused.

For the analysis of the seismic data of the region of TOKAI OKI from 2000 September, it is caused at the time that the graph indicated by the reference number 1 come to be minus and the earthquake of more or less M2 went on after the earthquake of more or less M4 was caused. The earthquake registered a magnitude of more or less 5.5 occurred in the place nearly equal to the M4 seismic source.

By using together with an electromagnetic seismic predictive method and data of a long period seismograph and underground water measurement which are disclosed on the Internet, it comes to be possible to get more precise information about the earth's crust, and further it is made possible to get hold of the characteristics of the seismic activities.

Unlike data of a strain meter and underground water, in which it is not possible to measure if a measuring tool is not set on the spot, a sea area, and a big city area where it is not possible to decide whether or not the electromagnetic seismic predictive method is valid, it is possible to get hold of the conditions of the earth's crust in the corresponding region using data by a suitable seismic wave throughout the world and a network of sensitive seismographs in Japan.

By using the methods thereof individually and/or per a corporation, it is also possible to cope with a small scale seismic disaster autonomously without necessarily relying on a seismic alarm that the Government and/or a local government has supposed by the law.

It is possible to get hold of the conditions of the earth's crust as various spectra by changing the number of the periods of is events. Thus, it comes to be possible visually to get hold of a seismic activity in the region.

What is claimed is:

1. A calculating method for forecasting a particular seismic event, which is more extensive than a predetermined magnitude value, using data of the preceding seismic events comprising steps of:
  (a) obtaining data of seismic events including 3 dimensional space coordinates of the hypocenters, time points and the magnitude values thereof,
  (b) designating each range of time and space coordinates and a lower limit value of magnitude of said data,
  (c) dividing said designated time range into a plural of periods from 1 to n each of which includes a predetermined number of the seismic events, (d) calculating relative distance ss0(tt2) between two hypocenters of sequential two seismic events for each seismic event, (e) calculating a first average ss1(I) of said relative distances for each period, (f) calculating Liapunov exponent sr1(I) for each period using two values of said first average for the period and the next period, (g) calculating a second average ssrr1(n) of said Liapunov exponents for all of said periods, (h) forecasting said particular seismic event based on said Liapunov exponent sr1(I) for I=n, sr1(n) and/or said second average ssrr1(n).

2. A method according to claim 1, further comprising steps of:

repeating said calculating steps from (a) to (g) using another value of said predetermined number of the seismic events in each period in said step (c) in order to calculate other values of said sr1(n) and ssrr1(n), forecasting said particular seismic event based on said other value(s) of said sr1(n) and/or ssrr1(n).

3. A method according to claim 2, wherein said another value of said predetermined number of the seismic events in each period is selected from 3 to 5.

4. A method according to claim 1, wherein said particular seismic event is forecast as that of magnitude more than 5, in case that said sr1(n) and/or said ssrr1(n) have/has value(s) of minus.

5. A method according to claim 1, wherein said particular seismic event is forecast as that of magnitude more than 6, in case that said designated range of space coordinates is included in a seismic blank area and said sr1(n) and/or ssrr1(n) have/has value(s) of minus.

6. A method according to claim 1, further comprising steps of:

(i) calculating total energy ee1(I) of said seismic events in each period using a magnitude value for each seismic event therein, (j) calculating a second Liapunov exponent er1(I) for each period using two values of said total energy for the period and the next period, (k) calculating a value Dd1(I) for each period using an expression of (er1(I)−er1(I+1))(sr1(I)−sr1(I+1)), (l) forecasting said particular seismic event based on said Dd1(I) for I=n, Dd1(n) and/or ssrr1(n).

7. A method according to claim 6, further comprising steps of:

repeating said calculating steps from (a) to (k) using another value of said predetermined number of the seismic events in each period in said step (c) in order to calculate other values of said Dd1(n) and ssrr1(n), forecasting said particular seismic event based on said other value(s) of Dd1(n) and/or ssrr1(n).

8. A method according to claim 7, wherein said another value of said predetermined number of the seismic events in each period is selected from 3 to 5.

9. A method according to claim 6, wherein said particular seismic event is forecast as that of magnitude more than 5, in case that said Dd1(n) and/or ssrr1(n) have/has value(s) of minus.

10. A method according to claim 6, wherein said particular seismic event is forecast as that of magnitude more than 6, in case that said designated range of space coordinates is included in a seismic blank area and said Dd1(n) and/or ssrr1(n) have/has value(s) of minus.

11. A calculating method for forecasting a particular seismic event, which is more extensive than a predetermined magnitude value, using data of the preceding seismic events comprising steps of:

(a) obtaining data of seismic events including 3 dimensional space coordinates of the hypocenters, time points and the magnitude values thereof, (b) designating each range of time and space coordinates and a lower limit value of magnitude of said data, (c) dividing said designated time range into a plural of periods from 1 to n each of which includes a predetermined number of the seismic events, (d) calculating relative distance ss0(tt2) between two hypocenters of sequential two seismic events for each seismic event, (e) calculating an average ss1(I) of said relative distances for each period, (f) calculating a first Liapunov exponent sr1(I) for each period using two values of average of said relative distances for the period and the next period, (g) calculating total energy ee1(I) of said seismic events in each period using a magnitude value for each seismic event therein, (h) calculating a second Liapunov exponent er1(I) for each period using two values of said total energy for the period and the next period, (i) calculating a value Dd1(I) for each period using an expression of (er1(I)−er1(I+1))(sr1(I)−sr1(I+1)), (j) forecasting said particular seismic event based on said Dd1(I) for I=n, Dd1(n) and/or said first Liapunov exponent sr1(I) for I=n, sr1(n).

12. A method according to claim 11, further comprising steps of:

repeating said calculating steps from (a) to (i) using another value of said predetermined number of the seismic events in each period in said step (c) in order to calculate other values of said Dd1(n) and sr1(n), forecasting said particular seismic event based on said other value(s) of Dd1(n) and/or sr1(n).

13. A method according to claim 12, wherein said another value of said predetermined number of the seismic events in each period is selected from 3 to 5.

14. A method according to claim 11, wherein said particular seismic event is forecast as that of magnitude more than 5, in case that said Dd1(n) and/or said sr1(n) have/has value(s) of minus.

15. A method according to claim 11, wherein said particular seismic event is forecast as that of magnitude more than 6, in case that said designated range of space coordinates is included in a seismic blank area and said Dd1(n) and/or sr1(n) have/has value(s) of minus.

16. A calculating method for forecasting a particular seismic event, which is more extensive than a predetermined magnitude value, using data of the preceding seismic events comprising steps of:

(a) obtaining data of seismic events including 3 dimensional space coordinates of the hypocenters, time points and the magnitude values thereof, (b) designating each range of time and space coordinates and a lower limit value of magnitude of said data, (c) dividing said designated time range into a plural of periods from 1 to n each of which includes a predetermined number of the seismic events, (d) calculating distance ssq0(tt2) between a hypocenter of seismic events and a predetermined base point for each seismic event, (e) calculating a first average ssq1(I) of said distances for each period, (f) calculating Liapunov exponent srq1(I) for each period using two values of said first average for the period and the next period, (g) calculating a second average ssrqr1(n) of said Liapunov exponents for all of said periods, (h) forecasting said particular seismic event based on said Liapunov exponent srq1(I) for I=n, srq1(n) and/or said second average ssrqr1 (n).

17. A method according to claim 16, further comprising steps of:

repeating said calculating steps from (a) to (g) using another value of said predetermined number of the seismic events in each period in said step (c) in order to calculate other values of said srq1(n) and ssrqr1(n), forecasting said particular seismic event based on said other value(s) of srq1(n) and/or ssrqr1(n).

18. A method according to claim 17, another value of said predetermined number of the seismic events in each period is selected from 3 to 5.

19. A method according to claim 16, wherein said particular seismic event is forecast as that of magnitude more than 5, in case that said srq1(n) and/or said ssrqr1(n) have/has value(s) of minus.

20. A method according to claim 16, wherein said particular seismic event is forecast as that of magnitude more than 6, in case that said designated range of space coordinates is included in a seismic blank area and said srq1(n) and/or said ssrqr1(n) have/has value(s) of minus.

21. A method according to claim 16, further comprising steps of:

(i) calculating total energy ee1(I) of said seismic events in each period using a magnitude value for each seismic event therein, (j) calculating a second Liapunov exponent er1(I) for each period using two values of said total energy for the period and the next period, (k) calculating a value Ddq1(I) for each period using an expression of (er1(I)−er1(I+1))(srq1(I)−srq1(I+1)), (l) forecasting said particular seismic event based on said Ddq1(I) for I=n, Ddq1(n) and/or said ssrqr1(n).

22. A method according to claim 21, further comprising steps of:

repeating said calculating steps from (a) to (k) using another value of said predetermined number of the seismic events in each period in said step (c) in order to calculate other values of said srq1(n) and ssrqr1(n), forecasting said particular seismic event based on said other value(s) of said srq1(n) and/or ssrqr1(n).

23. A method according to claim 22, another value of said predetermined number of the seismic events in each period is selected from 3 to 5.

24. A method according to claim 21, wherein said particular seismic event is forecast as that of magnitude more than 5, in case said Ddq1(n) and/or said ssrqr1(n) have/has value(s) of minus.

25. A method according to claim 21, wherein said particular seismic event is forecast as that of magnitude more than 6, in case said designated range of space coordinates is included in a seismic blank area and said Ddq1(n) and/or said ssrqr1(n) have/has value(s) of minus.

26. A calculating method for forecasting a particular seismic event, which is more extensive than a predetermined magnitude value, using data of the preceding seismic events comprising steps of:

(a) obtaining data of seismic events including 3 dimensional space coordinates of the hypocenters, time points and the magnitude values thereof, (b) designating each range of time and space coordinates and a lower limit value of magnitude of said data, (c) dividing said designated time range into a plural of periods from 1 to n each of which includes a predetermined number of the seismic events, (d) calculating relative distance ssq0(tt2) between two hypocenters of sequential two seismic events for each seismic event, (e) calculating an average ssq1(I) of said relative distances for each period, (f) calculating a first Liapunov exponent srq1(I) for each period using two values of average of said relative distances for the period and the next period, (g) calculating total energy ee1(I) of said seismic events in each period using a magnitude value for each seismic event therein, (h) calculating a second Liapunov exponent er1(I) for each period using two values of said total energy for the period and the next period, (i) calculating a value Ddq1(I) for each period using an expression of (er1(I)−er1(I+1))(srq1(I)−srq1(I+1)), (j) forecasting said particular seismic event based on said Ddq1(I) for I=n, Ddq1(n) and/or said first Liapunov exponent srq1(I) for I=n, srq1(n).

27. A method according to claim 26, further comprising steps of:

repeating said calculating steps from (a) to (i) using another value of said predetermined number of the seismic events in each period in said step (c) in order to calculate other values of said Ddq1(n) and srq1(n), forecasting said particular seismic event based on said other value(s) of said Ddq1 (n) and/or srq1(n).

28. A method according to claim 27, another value of said predetermined number of the seismic events in each period is selected from 3 to 5.

29. A method according to claim 26, wherein said particular-seismic event is forecast as that of magnitude more than 5, in case said Ddq1(n) and/or said srq1(n) have/has value(s) of minus.

30. A method according to claim 26, wherein said particular seismic event is forecast as that of magnitude more than 6, in case that said designated range of space coordinates is included in a seismic blank area and said Ddq1(n) and/or said srq1(n) have/has value(s) of minus.

* * * * *